US008773240B2

(12) United States Patent
Leconte et al.

(10) Patent No.: US 8,773,240 B2
(45) Date of Patent: Jul. 8, 2014

(54) METHOD FOR DETECTING AN IDENTIFICATION OBJECT IN A VEHICLE

(75) Inventors: Eric Leconte, Créteil Cedex (FR); Stéphane Violleau, Créteil Cedex (FR)

(73) Assignee: Valeo Securite Habitacle, Creteil (FR)

( * ) Notice: Subject to any disclaimer, the term of this patent is extended or adjusted under 35 U.S.C. 154(b) by 1153 days.

(21) Appl. No.: 12/489,278

(22) Filed: Jun. 22, 2009

(65) Prior Publication Data

US 2009/0315682 A1 Dec. 24, 2009

Related U.S. Application Data

(63) Continuation of application No. PCT/EP2007/064428, filed on Dec. 21, 2007.

(30) Foreign Application Priority Data

Dec. 22, 2006 (FR) ..................................... 06 11343

(51) Int. Cl.
*G06K 7/00* (2006.01)

(52) U.S. Cl.
USPC .... 340/10.1; 340/5.72; 340/5.61; 340/426.36

(58) Field of Classification Search
CPC ........... G07C 9/00309; G07C 2209/63; G07C 2009/00793; G06K 7/00
USPC .............. 340/10.1, 572.1, 5.61, 5.62, 426.36, 340/5.72
See application file for complete search history.

(56) References Cited

U.S. PATENT DOCUMENTS

| | | | | |
|---|---|---|---|---|
| 6,218,932 | B1 * | 4/2001 | Stippler | 340/426.16 |
| 6,915,122 | B2 * | 7/2005 | Meradi | 455/297 |
| 2005/0258936 | A1 * | 11/2005 | Ghabra et al. | 340/5.72 |
| 2006/0119467 | A1 * | 6/2006 | Brillion et al. | 340/5.1 |

FOREIGN PATENT DOCUMENTS

| | | | | |
|---|---|---|---|---|
| EP | 1 189 302 A1 | | 3/2002 | |
| EP | 1 363 354 A1 | | 11/2003 | |
| FR | 2 834 344 A1 | | 7/2003 | |
| FR | 2834344 | * | 7/2003 | G01S 11/06 |
| FR | 2 878 964 A1 | | 6/2006 | |

OTHER PUBLICATIONS

International Search Report for PCT/EP2007/064428 mailed Apr. 4, 2008 (3 pages).

* cited by examiner

*Primary Examiner* — Edwin Holloway, III
(74) *Attorney, Agent, or Firm* — Osha Liang LLP

(57) ABSTRACT

The invention relates to a method for detecting an identification object in an area (ZO) around an antenna device. The invention is characterized in that it comprises the following steps in which: a calibration signal (S_CAL) is emitted in the direction of the antenna device in order to determine a control power (PR); a functional signal (S_FONC) corresponding to the control power (PR) is emitted in the direction of the antenna device, such that the antenna device emits a predetermined magnetic field; the magnetic field (Br) received by the identification object, corresponding to the emitted magnetic field, is measured and compared with a nominal magnetic field (B0); and, depending on the result of said comparison, it is determined if the identification object is located inside the area (ZO) around the antenna device. The invention is suitable for motor vehicles.

16 Claims, 13 Drawing Sheets

METHOD FOR DETECTING AN IDENTIFICATION OBJECT IN A VEHICLE

CROSS REFERENCE TO RELATED APPLICATIONS

The present application is a continuation of PCT/EP2007/064428, filed Dec. 21, 2007; which claims priority to FR 0611343, filed Dec. 22, 2006.

FIELD OF THE INVENTION

The present invention relates to a method of detecting an identification object in an area around an antenna device and a detection system implementing the detection method.

It is particularly applicable for a motor vehicle fitted with a hands-free detection system.

STATE OF THE ART

According to a known state of the art, there is a method of detecting an identification object, such as a badge, which serves as a receiver-emitter for ascertaining whether it is located inside or outside the passenger compartment of the vehicle. If the badge is located inside the vehicle, the user is allowed to start the vehicle.

The detection of the badge is based on a magnetic field emitted from a constant power from a voltage regulation of the antenna device.

Such a solution presents the drawback of being difficult to implement. In practice, since the antenna device is fed with voltage by the vehicle battery voltage, each time this voltage varies (due to different actions such as a starting of the vehicle or a stopping of the engine, etc.), it has to be readjusted, to enable the antenna device to emit at a constant power.

OBJECT OF THE INVENTION

The aim of the invention is therefore more particularly to enable an detection of an identifying object with a simpler solution.

It therefore proposes a method of detecting an identification object in an area around an antenna device, characterized in that it comprises steps in which:

- a calibration signal is emitted in the direction of the antenna device to determine a setting power,
- a functional signal corresponding to the setting power is emitted in the direction of the antenna device such that the antenna device emits a predetermined magnetic field,
- the magnetic field received by the identification object, corresponding to the emitted magnetic field, is measured and compared with a nominal magnetic field,
- on the basis of this comparison, a determination is made as to whether the identification object is located inside the area around the antenna device.

Thus, as will be seen in detail hereinbelow, a detection of an identifying object will be obtained thanks to the calibration of the antenna device and to a comparison with a nominal magnetic field without needing a voltage regulation.

According to nonlimiting embodiments, the inventive method offers the following additional features.

- The calibration signal is unintelligible to the identification object. This enables the identification object to rapidly receive the functional signal afterwards.
- The method includes an additional step whereby:
  - when the calibration signal is sent, a current circulating in the antenna device is measured, and
  - the measured current is compared to an initial current so as to determine the setting power.

Thus, the calibration signal depends on a current measurement which is simple to implement.

- A power is set with a voltage of given duty cycle. This regulation is simple to implement. In addition, it makes it possible to compensate the variations of the power supply voltage of the antenna device.
- The voltage is a symmetrical signal. This makes it possible to eliminate the harmonics of even rank in the measured current signal and so obtain a more accurate measurement of the current.
- The duty cycle is equal to ⅓. This makes it possible to eliminate the harmonics of ranks that are multiples of three in the measured current signal and so obtain a more accurate measurement of the current.
- The voltage is generated by means of a power stage with full-bridge or half-bridge control. This makes it possible to obtain a greater range of currents.

The calibration signal is triggered on the basis of a particular event. This makes it possible to regularly have a re-updated calibration signal and therefore, consequently, a regular and accurate measurement of the magnetic field emitted by the antenna device.

- According to a first variant, the particular event is a vehicle access. This makes it possible to take account of the variations of the emitted magnetic field due to external events such as temperature variations.
- According to a second variant, the particular event is a battery voltage variation. This makes it possible to take account of these variations in the calibration.
- The method includes an additional initial step for writing a fixed threshold value in the identification object. This makes it possible to obtain a fixed reception field from which the identification object can receive signals from the antenna device and communicate with an associated control device.
- The fixed threshold value depends on a nominal magnetic field. This enables the identification object to respond to a signal emitted from the antenna device when it is in the area corresponding to the nominal magnetic field.
- The area around the antenna device is defined by the nominal magnetic field.
- The area around the antenna device corresponds to a vehicle passenger compartment. Thus, a determination is made as to whether the identification object is located inside the passenger compartment of the vehicle to allow the vehicle to start.

According to a second object, the invention relates to a system for detecting an identification object in an area around an antenna device, comprising a control device, an antenna device and an identification object, characterized in that:

- the control device is able to:
  - emit a calibration signal in the direction of the antenna device to determine a setting power,
  - emit a functional signal corresponding to the setting power in the direction of the antenna device such that the antenna device emits a predetermined magnetic field,
  - on the basis of a comparison made between the magnetic field received by the identification object and a nominal magnetic field, determine whether the identification object is located inside the area around the antenna device, the identification object is able to measure the received magnetic field corresponding to the emitted magnetic field and compare it with the nominal magnetic field.

According to a third object, the invention relates to an antenna device able to cooperate with an identification object, characterized in that it is able to:

receive a calibration signal corresponding to a predetermined initial power, receive a functional signal corresponding to a predetermined setting power so as to emit a predetermined magnetic field, and transmit the functional signal to the identification object, the latter receiving a magnetic field dependent on the magnetic field emitted by the antenna device.

According to a fourth object, the invention relates to a control device able to cooperate with an antenna device and with an identification object, characterized in that it comprises a signal emitter for:

emitting a calibration signal in the direction of the antenna device to determine a setting power, and emitting a functional signal corresponding to the predetermined setting power in the direction of the antenna device so that the antenna device emits a predetermined magnetic field.

According to a nonlimiting embodiment, the control device also includes a signal receiver for receiving a response from the identification object based on a comparison made between a received magnetic field and a nominal magnetic field.

According to a nonlimiting embodiment, the comparison is made by the identification object.

According to a fifth object, the invention relates to a motor vehicle comprising a passenger compartment in which there is a control device according to any one of the above features and an antenna device characterized according to any one of the above features, the two devices being able to cooperate with an identification object.

BRIEF DESCRIPTION OF THE FIGURES

Other features and benefits of the present invention will be better understood from the description based on the drawings, given by way of nonlimiting examples, among which.

DETAILED DESCRIPTION OF NONLIMITING EMBODIMENTS OF THE INVENTION

Figure 1:
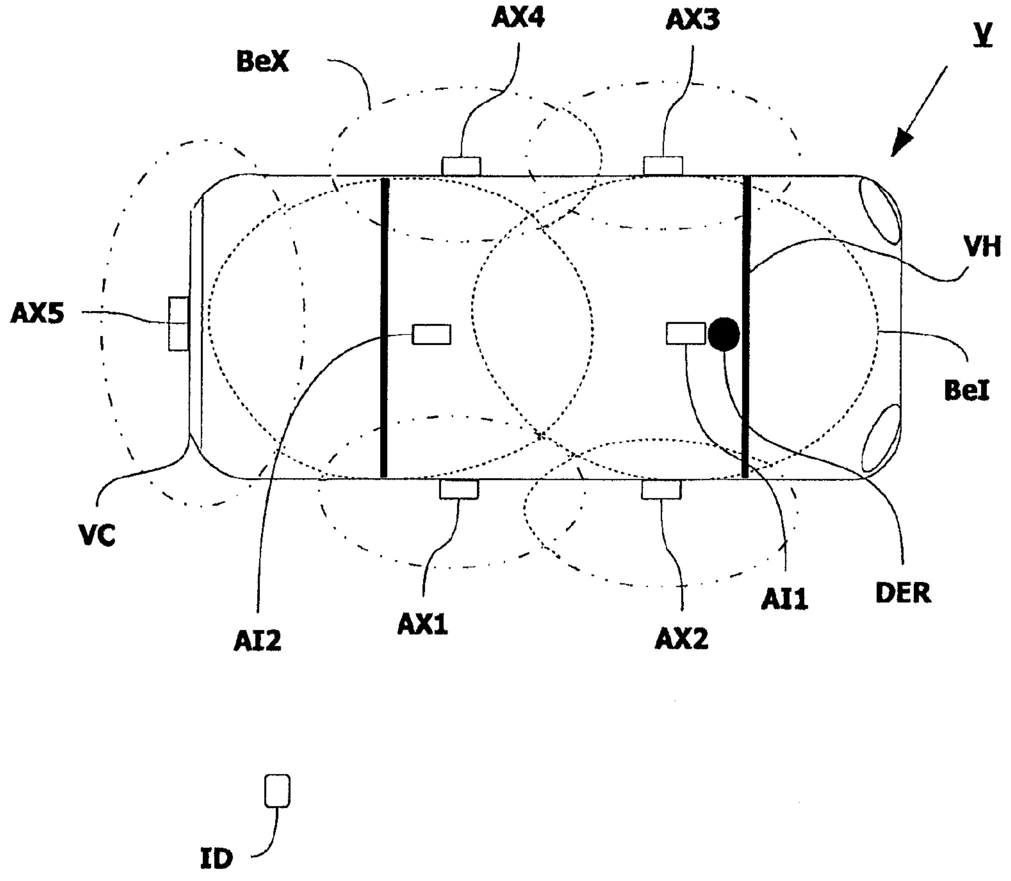
FIG. 1 is a plan view of a vehicle provided with a detection system implementing the method according to a nonlimiting embodiment of the invention.

FIG. 1 represents a vehicle V provided with a transceiver device DER for signals used to control an antenna device A, and the antenna device A comprising, in a nonlimiting example, a plurality of antennas, in this case "external" antennas AX and "internal" antennas AI, all these antennas cooperating with a receiver-emitter ID, the whole forming a detection system described hereinbelow.

The nonlimiting example of the figure shows five external antennas AX, of which four, AX1, AX2, AX3 and AX4, are located outside the passenger compartment VH of the vehicle V, in this case on handles of the doors, and one AX5 is located in the rear bumper VC of the vehicle. Moreover, two internal antennas AI1, AI2 are located in the passenger compartment VH, in this case at the front and at the rear of the vehicle. Each antenna is fed with low-frequency alternating current by the transceiver device DER and emits a magnetic field Be, denoted BeI for the internal antennas and BeX for the external antennas.

By means of their respective emitted magnetic fields B, the external antennas AX can be used to detect whether the receiver-emitter ID is located close to the vehicle V, in a nonlimiting example at a distance less than 1.5 mm, whereas the internal antennas AI can be used to detect whether the receiver-emitter ID is inside the passenger compartment VH of the vehicle.

The receiver-emitter ID, in this application, is, in a nonlimiting example, an identification object ID borne by a user of the vehicle V, for example a badge, a key, a keyfob, etc. The identification badge example will be taken as the example hereinafter in the description.

Using the alternating current, the antennas A communicate with the badge ID by data transmission by emitting a low-frequency signal BF and the badge ID responds by emitting a radio frequency signal RF. In a nonlimiting example, the low-frequency signal BF is situated in the region of 125 kHz and the radio frequency signal RF is situated in the region of 433 MHz. It is possible to drop down to 20 kHz for the low-frequency signal BF or go up to a GigaHz for the radio frequency signal RF depending on the frequency bands available for different countries (315 MHz for Asia, 868 MHz for certain European countries or 915 MHz in America, etc.).

On the basis of the response, the antennas A determine whether the badge ID is authorized to open the doors of the vehicle, or whether it is authorized to start the vehicle. It will be noted that, in a nonlimiting example, for the badge ID to be authorized to open the doors, the user must, for example, touch a door handle. To this end, the handles include appropriate detectors.

The external antennas AX determine a first area of communication with the badge ID to authorize vehicle access. This area is defined by the magnetic field emitted by said antennas. The external antennas AX must therefore guarantee at least a minimum distance from which the badge ID is authorized to access the vehicle.

The internal antennas AI determine a second area ZO of communication with the badge ID to authorize a start. This area is defined by the magnetic field emitted by the internal antennas. The internal antennas AI must therefore guarantee a fixed area from which the badge ID is authorized to start the vehicle, this area being the passenger compartment VH of the vehicle V.

It will be noted that, in practice, the magnetic field emitted by these internal antennas AI has a greater coverage than the passenger compartment VH but is limited by the metal bodywork of the passenger compartment VH of the vehicle V and overflows through the window openings.

The detection of the badge ID in the second area ZO is based on the fact that the badge is initialized with a fixed threshold value S0 that is dependent on a received magnetic field B0, called nominal field. In a nonlimiting manner, this fixed threshold value S0 is a power P0 corresponding to the nominal field B0.

It will be recalled that a magnetic field Br received by the badge ID is dependent on the magnetic field Be emitted by the antenna device A, the latter defining the area ZO around it representative of its magnetic field Be that has also been called communication area.

Figure 2:
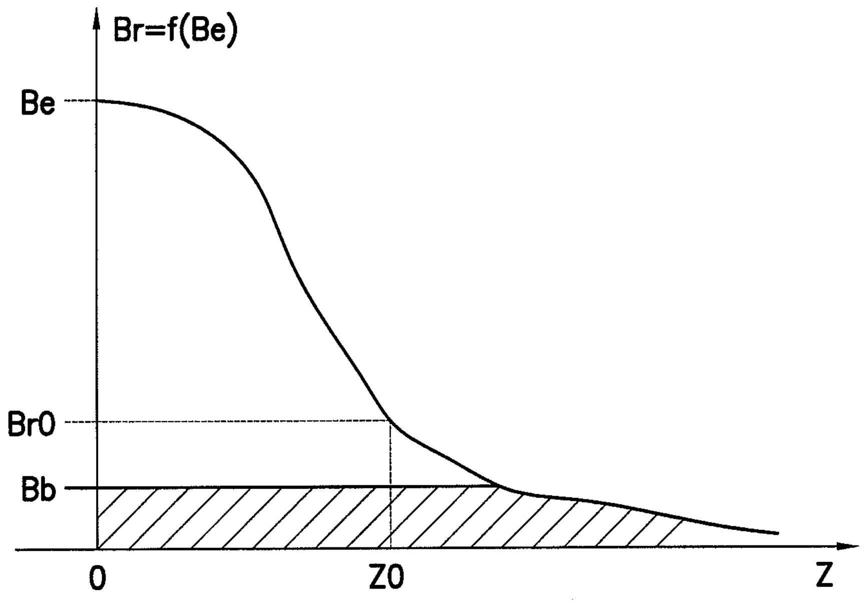
FIG. 2 is a diagram representative of a reception from an identification object detected by the method according to a nonlimiting embodiment of the invention.

FIG. 2 illustrates the position of the badge ID relative to an antenna A of the antenna device according to the magnetic field Be of this antenna A and therefore the corresponding received magnetic field Br.

It can be seen that the more distant the badge ID becomes from an antenna A emitting an emitted magnetic field Be, the weaker the corresponding received magnetic field Br becomes. When the badge ID is located in the same place as the antenna A, the received magnetic field Br is theoretically equal to the emitted magnetic field Be.

The nominal magnetic field B0 therefore corresponds to the nominal communication area ZO in which a badge ID can communicate with an antenna A and the transceiver device DER.

When the badge ID is outside this area ZO (the received magnetic field Br is less than the nominal received magnetic field B0), the badge ID does not respond to the signals sent by the antenna device A or sends a deliberately wrong radio frequency response RF. That means that it is located outside the passenger compartment VH of the vehicle. Otherwise, it responds by emitting a radio frequency signal RF. It will be noted that this nominal magnetic field B0 is fixed so as to avoid the spurious magnetic fields Bb originating from the radio disturbances as illustrated in FIG. 2 and its value is greater than the value of the spurious magnetic fields.

Figure 3:
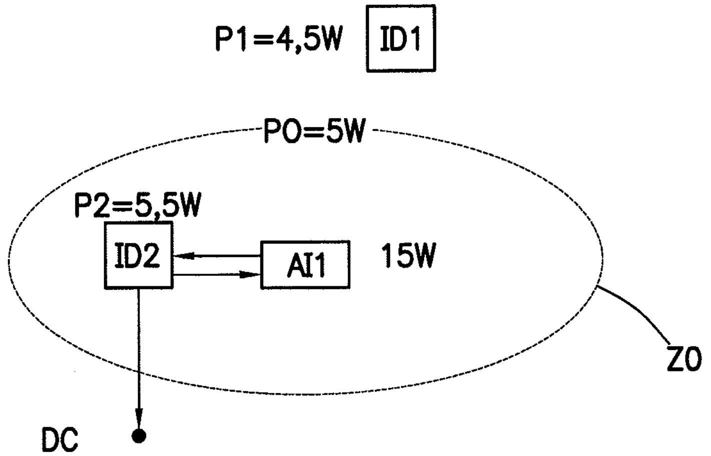
FIG. 3 is another representation of this limit threshold for reception from an identification object detected by the method according to a nonlimiting embodiment of the invention.

FIG. 3 illustrates an example of positioning of the badge ID relative to an internal antenna AI1.

The antenna AI1 emits a magnetic field Be at a power of 15 watts. The fixed threshold value S0 is fixed at P0=5 watts. The badge ID, when it is in the position ID1, receives a magnetic field Br1, the power P1 of which is 4.5 watts and therefore less than the fixed threshold S0; it is therefore located outside the area ZO defined by the threshold S0 and therefore will not communicate with the antenna AI1 and the transceiver device DER.

The badge ID, when it is in the position ID2, receives a magnetic field Br2, the power P2 of which is 5.5 watts and therefore greater than the fixed threshold S0; it is therefore located in the communication area ZO and will therefore communicate with the antenna AI1 and the transceiver device DER.

Figure 4:
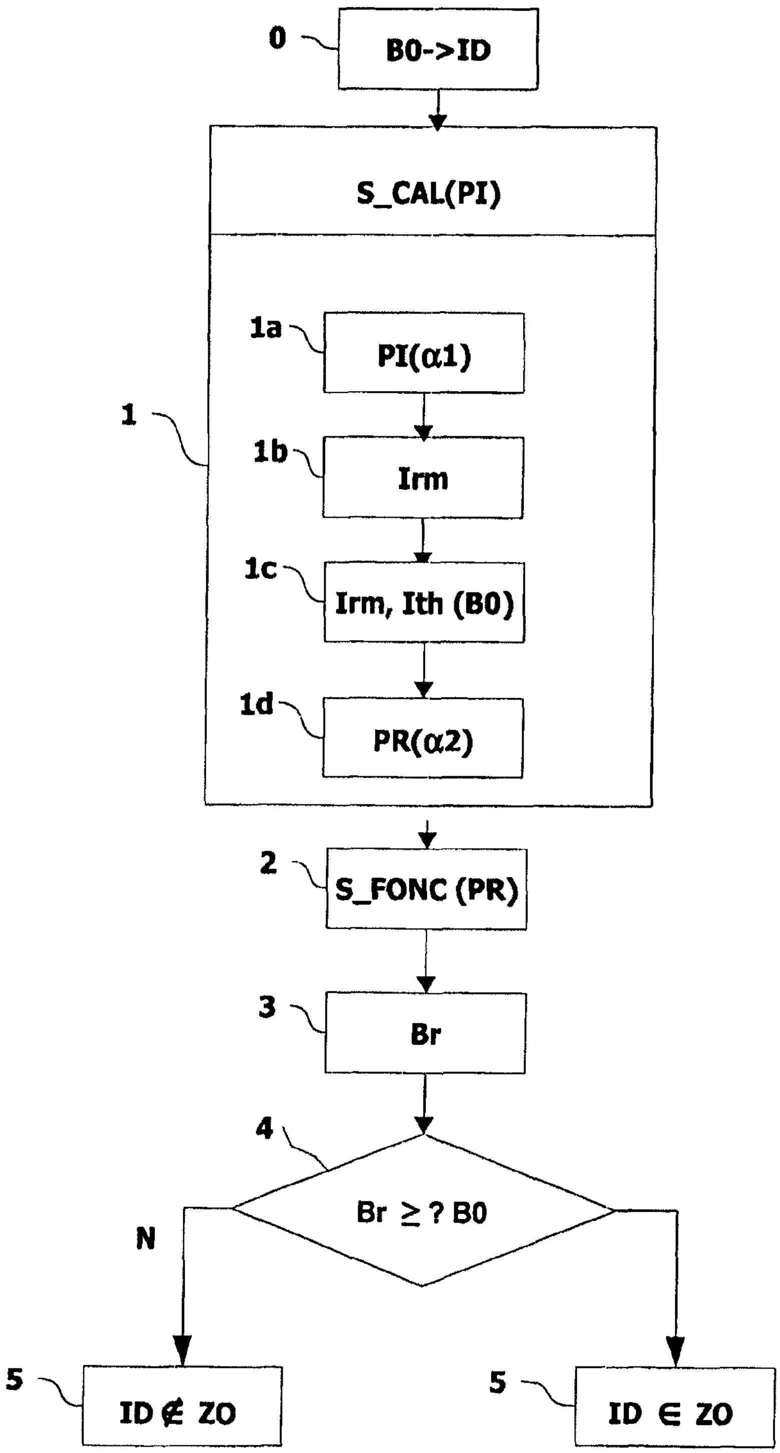
FIG. 4 is a diagram of a nonlimiting embodiment of the method according to a nonlimiting embodiment of the invention.

Thus, the method of detecting the badge ID to ascertain whether it is located in the communication area ZO of an antenna, in particular an internal antenna AI, proceeds as follows as illustrated in FIG. 4.

In an initial step 0), when the badge ID is manufactured, the fixed threshold value S0 is written into a memory of the badge ID, for example an EEPROM-type rewritable memory.

Figure 5:
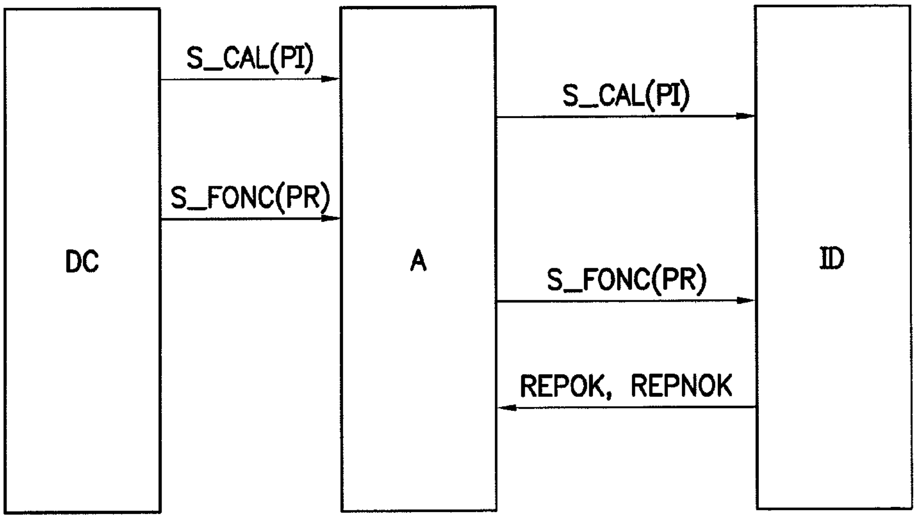
FIG. 5 is a nonlimiting embodiment of a communication used between an identification object and an antenna device in the context of the method of FIG. 4.

Then, when the badge ID and the antenna device A are in use, that is, in operating mode, in a first step 1), a calibration signal S_CAL, also called calibration frame, is emitted in the direction of the antenna device A at a predetermined initial power PI to determine a setting power PR for the antenna device A. Such a signal emission is illustrated in FIG. 5.

In a nonlimiting embodiment, the calibration signal S_CAL is triggered on the basis of a particular event.

In a nonlimiting example, the particular event is a vehicle access. In practice, a vehicle access is representative of a change of the environment of the antenna device A, that a temperature variation (due, for example, to the different seasons), which influences the components of the antenna device and consequently leads to a variation of its impedance Z and therefore of its emitted magnetic field Be.

In another nonlimiting example, the particular event is a variation of power supply voltage, in this case the battery voltage Ubat (which can vary after an engine start or after an engine stop for example). This makes it possible to take these variations into account in the calibration, these variations influencing the current circulating in the antenna device. These battery voltage variations are thus compensated, since in this case the current Irm is measured after a battery voltage variation.

The aim of this step is therefore to take into account the variations of the impedance Z of the antenna device A in determining the magnetic field Be emitted by the antenna device A and consequently in determining a setting power PR to be applied to the antenna device A.

The impedance variations Z which appear when using the antenna device in the vehicle, and therefore when it is operating, are thus taken into account.

It will be noted that the calibration signal S_CAL is unintelligible to the identification object ID. Thus, although the identification object ID receives it, it does not respond to this signal S_CAL. This avoids, for the badge, an additional activation-deactivation period for receiving this signal. Thus, the badge ID will more rapidly receive the data included in the functional signal S_FONC that it will receive subsequently.

Thus, in a first substep 1a), an initial power PI is determined, for sending the calibration signal S_CAL. The initial power PI is obtained by means of a calibration voltage UC of initial duty cycle $\alpha 1$ corresponding to a theoretical initial current Ith. It will be noted that this theoretical initial current Ith is determined experimentally by tests on vehicles. Its value varies according to the type of vehicle V.

In a nonlimiting embodiment, this voltage is square. This makes it possible to avoid a dissipation of energy in the power stage used to apply this voltage and described hereinbelow. In practice, there is calorific energy consumption only during the transition phases, unlike a sinusoidal-type voltage where the consumption is significantly greater. This power stage does not therefore overheat.

In a second substep 1b), when the calibration signal S_CAL is sent, the real current Irm circulating in the antenna device A is measured. In practice, although an initial power PI is applied that corresponds to the theoretical initial current Ith, because of the impedance Zr of the antenna device A, the current circulating in said device is not, in practice, equal to the theoretical initial current Ith.

Figure 6:
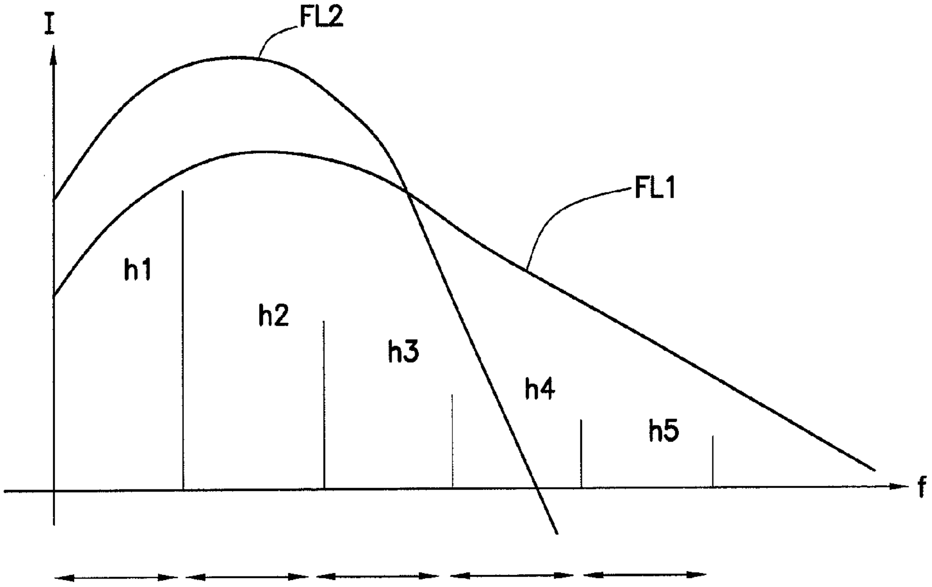
FIG. 6 represents a frequency spectrum of a current circulating in an antenna device and measured in the context of the method of FIG. 4.

The measurement of the current Irm circulating in the antenna device A can be taken simply by a peak amplitude detector C described hereinbelow. This current Irm is an alternating current, the frequency spectrum of which includes harmonics h. In FIG. 6, the harmonics of ranks 1 to 5 are represented in a simplified and nonlimiting example.

In a nonlimiting embodiment, the antenna device A is tuned to the emission frequency (the frequency being, for example, 125 kHz). This makes it possible to emit a higher-amplitude magnetic field at the emission frequency, and have a bandpass filter FL. The bandpass filter FL is thus used to reduce the amplitude of the harmonics h (except for the harmonic of rank 1).

In practice, on emission, on the side of the antenna device A, the value of the current Irm circulating in the antenna device A is equal to the sum of the harmonics h that are present in the bandwidth of the filter included in the antenna device A. Depending on the selectivity of the filter, all the harmonics will be included if the filter is wideband as represented by FL1 in FIG. 6, or only some of the harmonics will be included if the filter is narrowband as represented by FL2 in FIG. 6. Therefore, when emitting, the value of the emitted field Be is dependent on this current Irm with harmonics h.

On reception, on the side of the badge ID, the value of the current Irm which is taken into account is also only with the harmonic h1 of rank 1, called fundamental. In practice, the received magnetic field Br (and consequently the fixed threshold value S0) corresponds to the emitted magnetic field Be with the value of the fundamental only and not the sum of the harmonics.

It is therefore necessary to determine accurately the power emitted on the harmonic h1 of rank 1 to make it possible to emit an emitted magnetic field Be corresponding accurately to the nominal field B0 and therefore to the fixed threshold S0 of the badge ID. Consequently, a measurement of current Irm must be performed so as to eliminate as far as possible the harmonics other than the fundamental h1.

This is performed by means of the calibration voltage UC of initial duty cycle α1 that is used to obtain the initial power PI.

When the calibration voltage UC is any square signal, all the harmonics of the measured current Irm can be present as illustrated in FIG. 6.

Figure 7:
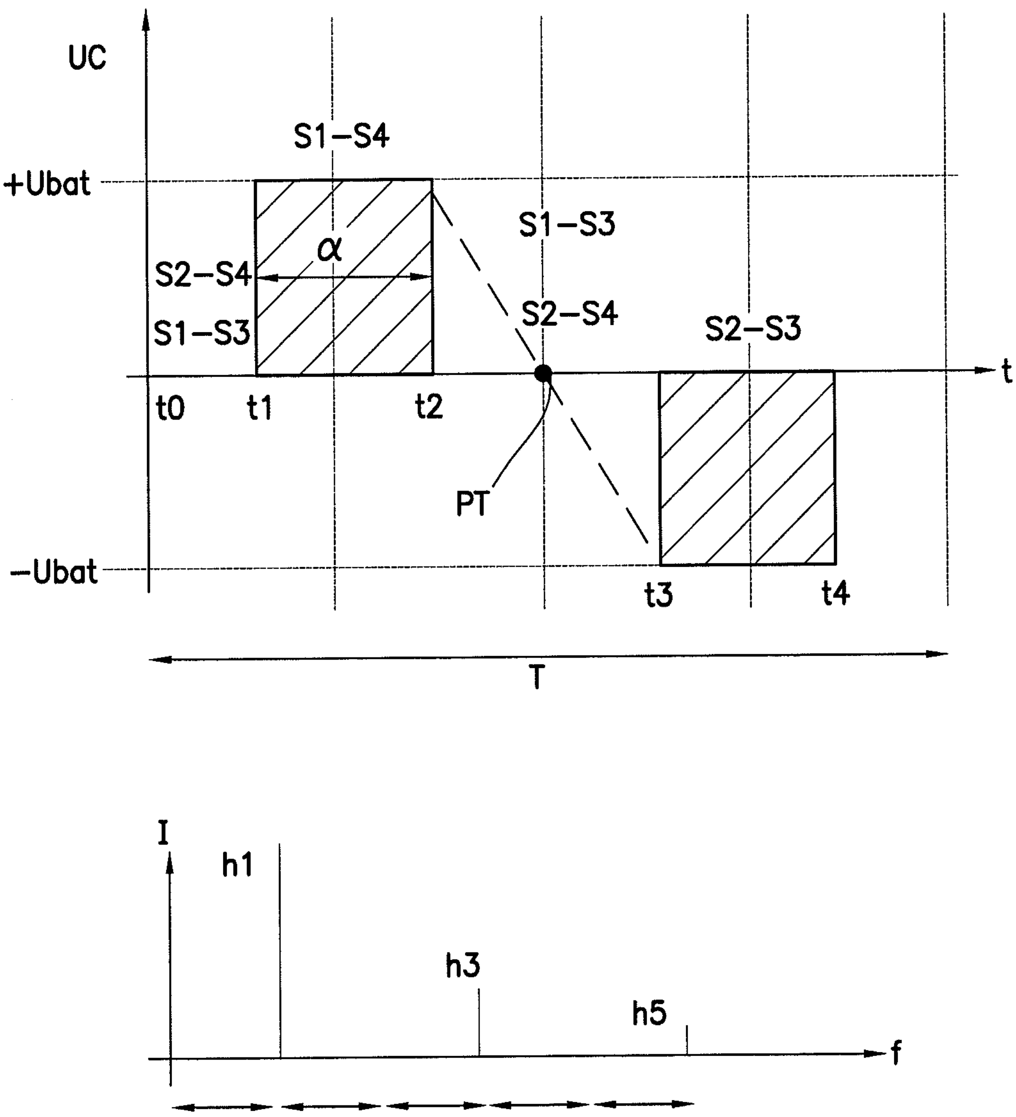
FIG. 7 represents a first embodiment of a voltage signal applied to the antenna device in the context of the method of FIG. 4 and an associated current frequency spectrum.

In a first nonlimiting embodiment, the calibration voltage UC is a symmetrical voltage. As can be seen in FIG. 7, in this case, the harmonics of even rank of the measured current Irm have been eliminated. As can be seen, the voltage UC is symmetrical relative to the point PT. The symmetrical voltage UC will make it possible to obtain an accurate generation and an accurate measurement of the initial power PI corresponding to the harmonic h1 of rank 1 by eliminating the spurious currents due to the other harmonics.

In practice, in a frequency representation, a harmonic of rank n is represented by the term $a_n \cos n\omega t + b_n \sin n\omega t$.

The voltage UC is an odd function, in other words f(−x)=−f(x), so its Fourier series development includes only sine terms, the coefficients $a_n$ being zero.

Thus, knowing that $$Cn = \frac{1}{T}\int f(x)e^{-jn\omega x}dx \text{ and } Cn = \frac{1}{2}(an - jbn)$$

we obtain:

$$Cn=j(2E/\pi n)\sin(n\pi\alpha 1)\cdot\sin(n(\pi/2))$$

and $$bn=(4E/\pi n)\cdot\sin(n\pi\alpha 1)\cdot\sin(n(\pi/2))$$

with ω=2π/T, with T being the period and E the amplitude of the power supply voltage Ubat of the antenna device.

The Fourier series corresponding to the symmetrical voltage signal UC is therefore equal to:

$$f(x)=\Sigma(4E/\pi n)\cdot\sin(n\pi\alpha 1)\cdot\sin(n(\pi/2)\cdot\sin n\omega x, \text{with } n=1, \ldots, \infty$$

or $$f(x)=\Sigma(4E/(\pi(2p+1)))\cdot\sin((2p+1)\pi\alpha 1)\cdot\sin((2p+1)(\pi/2))\cdot\sin(2p+1)\omega x, \text{with } p=0, \ldots, \infty,$$

which gives the spectrum with the harmonics in FIG. 7.

The value of the fundamental h1 is given by:

$$h1=(4E/\pi)\cdot\sin\pi\alpha 1\cdot\sin\omega x.$$

Moreover, it will be noted that the fact of having a square voltage avoids a dissipation of energy in the transistors of the power stage P. In practice, there is a calorific energy consumption only during the transition phases unlike with a sinusoidal-type voltage where the consumption is significantly greater. This power stage P therefore does not overheat.

It will be noted that the value of the adjustable duty cycle α1 can be used to adjust the value of the initial power PI.

Thus, the square symmetrical voltage makes it possible on the one hand to set the emitted initial power PI to a required value corresponding to the required communication area ZO (and therefore accurately generate the emitted power PI) and on the other hand to obtain an accurate measurement of the real emitted power PI corresponding to the actual received power of the badge ID because the harmonics of even rank are eliminated.

Figure 8:
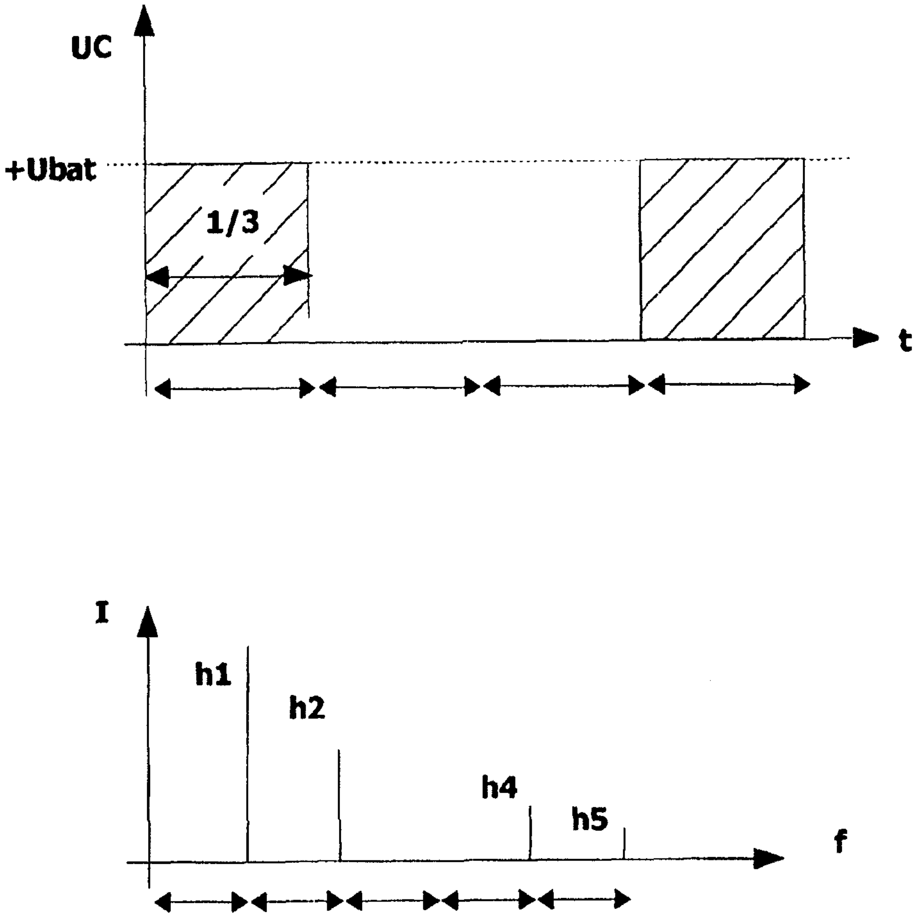
FIG. 8 represents a second embodiment of a voltage signal applied to the antenna device in the context of the method of FIG. 4 and an associated current frequency spectrum.

In a second nonlimiting embodiment, the calibration voltage UC includes a duty cycle of ⅓ which corresponds to an offset of π/3 of the voltage signal UC. As can be seen in FIG. 8, in this case, the harmonics of ranks that are a multiple of 3 of the measured current Irm have been eliminated.

Figure 9:
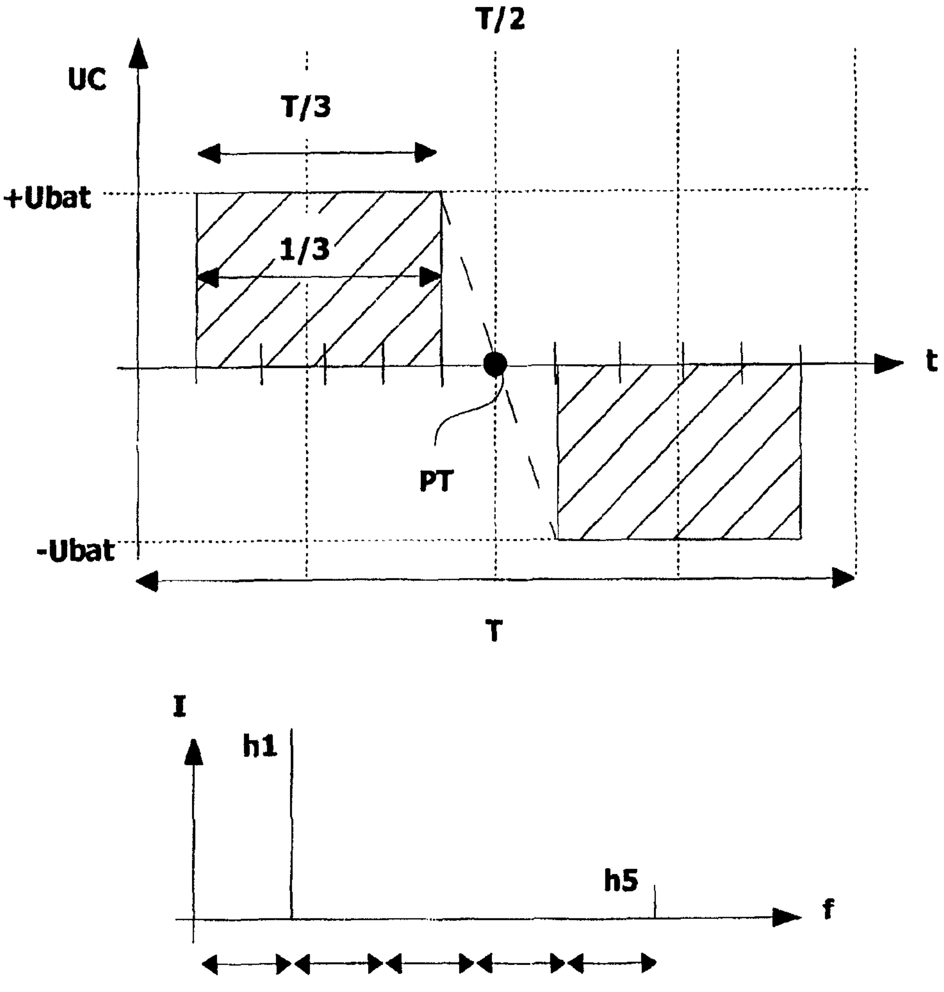
FIG. 9 represents a third embodiment of a voltage signal applied to the antenna device in the context of the method of FIG. 4 and an associated current frequency spectrum.

It will be noted that the two embodiments can be combined. In this case, as can be seen in FIG. 9, all that remain are the harmonics of ranks 1 and 5, the latter being negligible.

Thus, we obtain an accurate measurement of the current Irm circulating in the antenna device A. The measured current Irm is therefore in this case representative of the amplitude of the fundamental of the emitted magnetic field.

Consequently, it is possible to deduce from this the initial power PI emitted by the antenna device A (and therefore the emitted magnetic field Be), corresponding accurately to the received power Pr, knowing that the emitted magnetic field Be is proportional to the measured current Irm.

Figure 10:
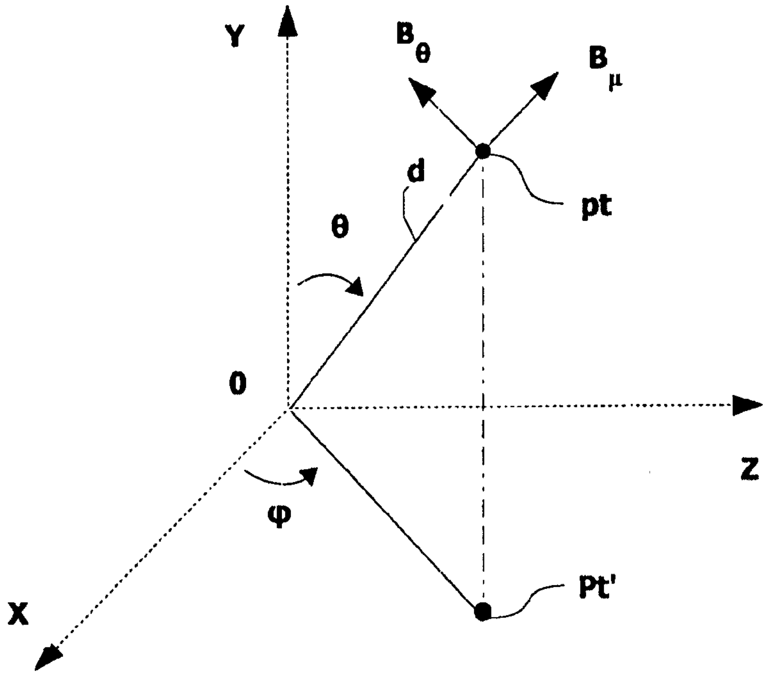
FIG. 10 represents a magnetic field in space, a component of which corresponds to an emitted magnetic field in the context of the method of FIG. 4.

It will be recalled that, in a manner known to those skilled in the art, a magnetic field B comprises three components in an orthogonal space x, y, z as illustrated in FIG. 10, which are as follows:

$$B_\mu=(AeIm/2\pi d^3)*\cos\theta,$$

$B_\theta=(AeIm/4\pi d^3)*\sin\theta$, and $B_\phi=0$, with Ae being the actual surface area of an antenna through which the magnetic field B flows, d the distance that allows a measurement of the magnetic field B from the center of the antenna.

It will also be recalled that $Ae=N_w*A*\mu_{rod}$ with $N_w$ being the number of turns in the antenna, A the transverse cross section of the ferrite rod of the turns, and $\mu_{rod}$ the apparent permeability of the ferrite rod.

It will be noted that the calibration voltage UC can be obtained by means of a power stage P with H bridge with full bridge control described hereinbelow.

In a third substep 1c), the measured current Irm is compared to the theoretical initial current Ith. The difference will be used to determine the real impedance Zr of the antenna device A and consequently to determine the setting power PR to be applied to the antenna device A.

It will be recalled that, to obtain an area ZO around the antenna device A corresponding to the passenger compartment VH of the vehicle, an emitted field Be is determined that corresponds to a power PR. This field that is wanted, and whose value is therefore known, therefore corresponds to a known current Iv. To supply the antenna device A with this known and wanted current Iv, the power PR of said antenna device must be set taking into account its impedance Zr.

The setting power PR is set by means of a functional voltage UF of setting duty cycle α2.

In a fourth substep 1d), a setting duty cycle α2 is therefore determined.

The calculation of the setting duty cycle α2 is deduced as follows:

the following applies: Irm=(Ubat*sin(α1π))/Zr, hence Zr=(Ubat*sin(α1π))/Irm and Iv=(Ubat sin(α2 π))/Zr hence $$\sin(\alpha 2\pi) = (Zr*Iv)/Ubat = Ubat*\sin(\alpha 1\pi)*Iv)/(Irm*Ubat) = \sin(\alpha 1\pi)*(Iv/Irm) \text{ hence } \alpha 2 = (1/\pi)*\text{Arcsin}(\sin(\alpha 1\pi)*(Iv/Irm)) \quad [1]$$

It can be noted that, in practice, in the calculation [1] of the setting duty cycle α2, the real impedance Zr of the antenna device A is no longer involved.

In a first nonlimiting embodiment, the setting duty cycle α2 is calculated by means of a microprocessor of the transceiver device DER described hereinbelow.

In a second, simpler and faster embodiment, the setting duty cycle α2 is defined on the basis of a pre-filled mapping table (not represented) by using the formula sin (α1π)/sin (α2π)=Irm/Iv [2]. In this table, on each difference between the measured current Irm circulating in the antenna device when a calibration signal S_CAL is sent and the theoretical current Ith, the setting duty cycle α2, corresponding to a wanted functional current Iv and taking into account the variations of the impedance Zr of the antenna device A, is recovered from the table.

Such a table takes the following form:

| | Irm1 | Irm2 | Irm3 | Etc. |
|---|---|---|---|---|
| Iv1 | $\alpha 2_{11}$ | $\alpha 2_{12}$ | $\alpha 2_{13}$ | $\alpha 2_{1\ldots}$ |
| Iv2 | $\alpha 2_{21}$ | $\alpha 2_{22}$ | $\alpha 2_{23}$ | $\alpha 2_{2\ldots}$ |
| Iv3 | $\alpha 2_{31}$ | $\alpha 2_{32}$ | $\alpha 2_{33}$ | $\alpha 2_{3\ldots}$ |
| Etc. | Etc. | Etc. | Etc. | Etc. |

-continued

With Iv1, Iv2, Iv3, etc. being the different values of the wanted current Iv, Irm1, Irm2, Irm3, etc., the different values of the measured current Irm circulating in the antenna device A, and $\alpha 2_{11} \ldots \alpha 2_{21} \ldots \alpha 2_{31}$ etc. being the corresponding different setting duty cycle values.

Figure 11:
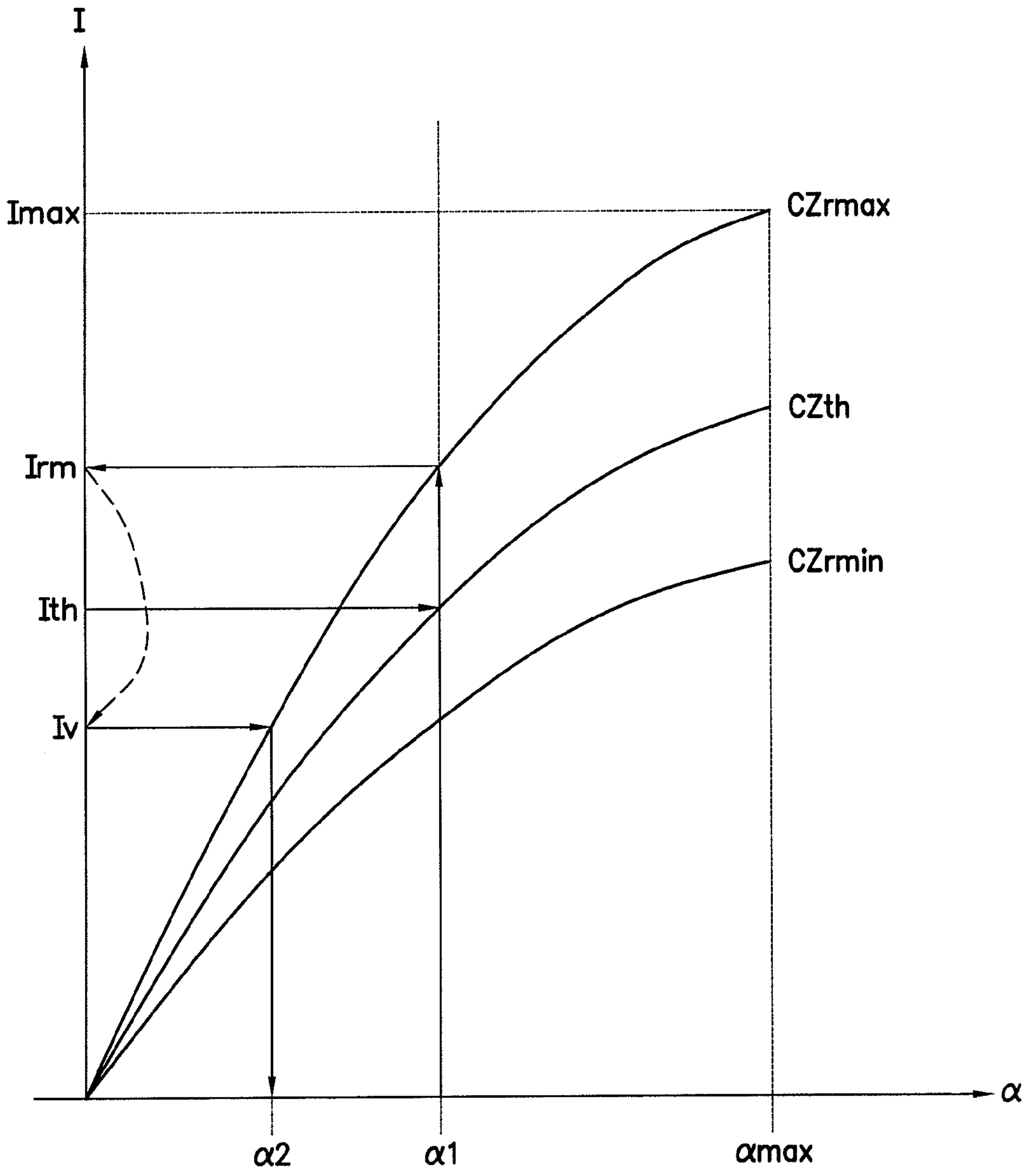
FIG. 11 represents a current duty cycle diagram explaining certain steps executed by the method according to FIG. 4.

The application of the formula [1] or else the choice of the setting duty cycle α2 from this mapping table amounts to using a curve CZ representative of the real impedance Zr to determine the setting duty cycle α2 to be applied to the antenna device A, as illustrated in the diagram of FIG. 11 in a nonlimiting example.

The duty cycle α is represented on the x axis and the current I on the y axis. As can be seen, for a theoretical initial current Ith, a voltage of initial duty cycle α1 is applied. The correlation between this initial duty cycle α1 and the theoretical initial current Ith is located on a curve CZth representative of the theoretical impedance Zth of the antenna device A.

The real current Irm circulating in the device with this initial duty cycle α1 is measured. The correlation between this duty cycle α1 and the measured real current Irm is situated on a curve representative of the real impedance Zr of the antenna device A. Two curves, maximum CZrmax and minimum CZrmin, of this real impedance Zr are represented. In the example, we have taken the curve CZmax corresponding to the maximum of the real impedance Zrmax.

Finally, for a wanted current Iv, the corresponding setting duty cycle α2 is determined by taking the curve of the real impedance Zr, or in this case CZrmax, and by making a projection on the x axis.

The setting duty cycle α2 has therefore been found, so as to apply the wanted functional voltage UF to obtain a wanted power PR in the antenna device A.

It will be noted that the functional voltage UF can be obtained by means of a power stage P with H bridge with full-bridge and half-bridge control described hereinbelow.

This first calibration step 1) therefore corresponds to a self-calibration of the detection system SYS to determine the setting power PR. In practice, no external measuring instrument is needed for this calibration. Furthermore, this self-calibration is dynamic in that it is initiated while the antenna device is operating, and not when the antenna device is being debugged in the factory for example.

In a second step 2), after having sent the calibration signal S_CAL, a functional signal S_FONC, also called functional frame, is then sent in the direction of the antenna device A, as illustrated in FIG. 5, at the setting power PR determined hereinabove so that the antenna device A emits a predetermined magnetic field Be corresponding to the wanted area ZO and more particularly to the vehicle passenger compartment VH in the example of the vehicle application.

In a third step 3), the magnetic field Br received by the identification object ID corresponding to the magnetic field Be emitted by the antenna device A is measured. This measurement is made by means of an amplifier RSSI (received signal strength indication) type measurement device well known to those skilled in the art included in the identification object ID.

In a fourth step 4), the received magnetic field Br is compared with the nominal magnetic field B0. This comparison is made in the identification object ID.

In a fifth step 5), a determination is made as to whether the badge ID is located in the area ZO around the antenna device A on the basis of this comparison.

Thus, the badge ID is located in the area ZO around the antenna device A, and therefore inside the vehicle passenger compartment VH, if the received magnetic field Br is greater than the nominal magnetic field B0. The badge ID then returns an affirmative response REPOK to a control device DC of the transceiver device DER, as illustrated in FIG. 5. The latter then allows a vehicle start for example.

On the other hand, the badge ID is located outside the area ZO, and therefore outside the vehicle passenger compartment VH, if the received magnetic field Br is less than the nominal magnetic field B0. In this case, either the badge ID returns no response, it acts as if it had not received the functional signal S_FONC from the antenna device A, or it returns a negative response REPNOK to the control device DC, as illustrated in FIG. 5. The latter then prevents any vehicle start for example.

In another variant, whether it is inside or outside the area ZO, the badge ID systematically sends a response REP containing the result of the comparison.

Figure 12:
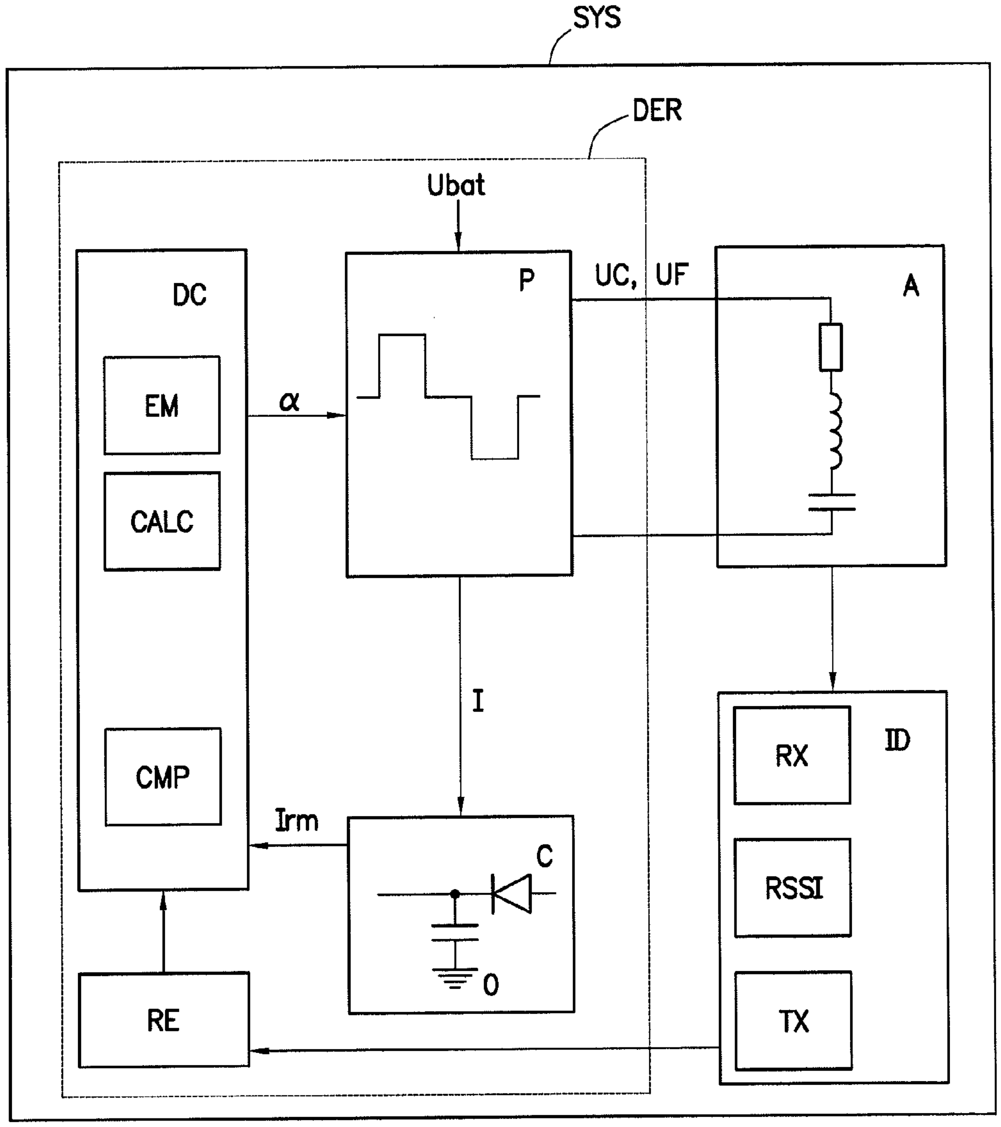
FIG. 12 represents a nonlimiting embodiment of a detection system implementing the method of FIG. 4.

The method that has been described is implemented by a detection system SYS illustrated in a nonlimiting embodiment in FIG. 12 and comprising:

- a transceiver device DER comprising:
  - a control device DC,
  - a power stage P,
  - a current measuring device C,
  - a signal receiver RE in particular for receiving a response REPOK, REPNOK from the identification badge ID on the basis of the comparison made between the received magnetic field Br and the nominal magnetic field B0,
- the antenna device A, and
- a receiver-transmitter, in this case the identification badge ID.

It will be noted that according to a nonlimiting embodiment, all the elements of the transceiver device DER are located on one and the same electronic card. This enables a faster and more reliable dialogue between these various elements. On the other hand, when these elements are separate, the communication links linking them can be more easily disturbed and the bit rates of these links can be lower.

Since the identification badge ID is known to those skilled in the art, it is not described here.

The other elements are described in more detail hereinbelow.

Antenna Device A

In a first nonlimiting embodiment, the antenna device A consists of an RL circuit. The latter needs to amplify the power supply voltage of the antenna device to enable an appropriate magnetic field emission.

In a second nonlimiting embodiment, the antenna device A consists of an RLC circuit. The latter can use the power supply voltage of the antenna device A, which is in this case the battery voltage Ubat of the vehicle V, to directly amplify the current I circulating in the antenna device A to enable an appropriate magnetic field emission, without using voltage locking unlike in the first embodiment. It is therefore a solution that is simpler to implement to obtain an amplification. This RLC circuit also serves as a bandpass filter as seen previously.

The Control Device DC Comprises:

- a signal emitter EM for, in particular:
  - emitting the calibration signals S_CAL in the direction of the antenna device A,
  - emitting the functional signals S_FONC in the direction of the antenna device A,
  - emitting control signals in the direction of the power stage P to supply the power supply voltage Ubat to the antenna device A,
- a comparator CMP of current Irm, Ith, and
- a computation member CALC (for example a microprocessor or an ASIC) used in particular to adapt the duty cycles $\alpha 1$ and $\alpha 2$ of the calibration UC and functional UF voltages.

In a nonlimiting embodiment, the control device DC can also comprise:

the signal receiver RE in particular for receiving a response REPOK, REPNOK from the identification badge ID on the basis of the comparison made between the received magnetic field Br and the nominal magnetic field B0.

Power Stage P

This supplies the calibration voltage UC used to set the initial power PI and the functional voltage UF used to set the setting power PR of the antenna device A.

Figure 13:
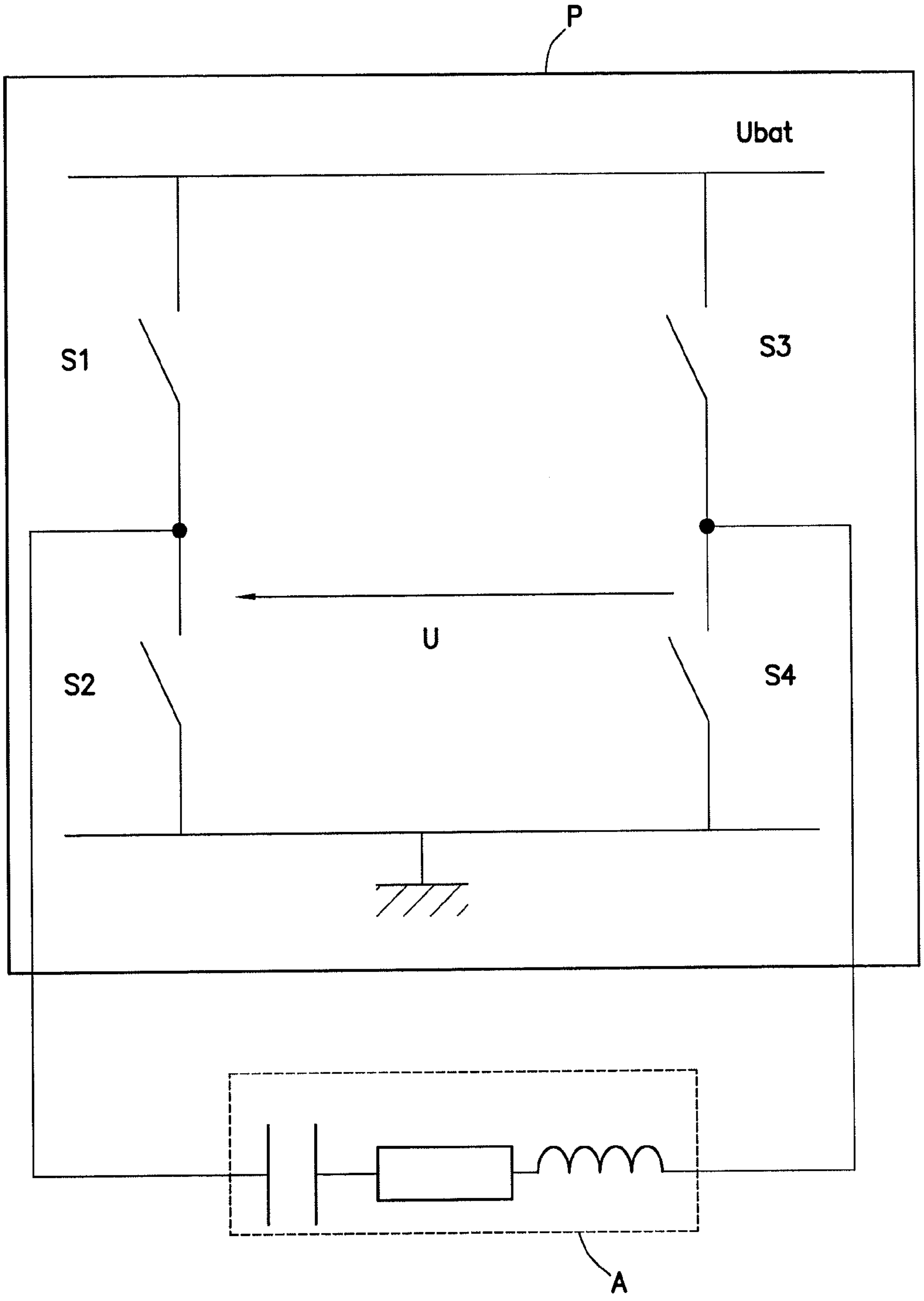
FIG. 13 represents a nonlimiting embodiment of a power stage included in the detection system of FIG. 12.

In a nonlimiting embodiment, the power stage P is an H bridge with full-bridge or half-bridge control. It is illustrated in FIG. 13. It comprises in particular four switches S1 to S4. These switches are, in a nonlimiting example, MOSFET-type transistors.

In order to supply a voltage, the power stage P operates in full-bridge mode as follows. The example is taken for a symmetrical voltage as illustrated in FIG. 7.

- Between the intervals t0-t1 and t2-t3, either all the switches are open, or the switches S2 and S4 are closed, or the switches S1 and S3 are closed, the others being open. The voltage UC is zero.
- Between the interval t1-t2, the switches S1-S4 are closed, the others being open. The voltage UC is positive.
- Between the interval t3-t4, the switches S2-S3 are closed, the others being open. The voltage UC is negative.

The two diagonals of the bridge are controlled by two control signals delayed relative to each other by a half period thus making it possible to obtain the symmetry. When the power stage P operates in full-bridge mode, the voltage obtained can be used to obtain a first range of currents G1=[I11-I12].

Figure 14:
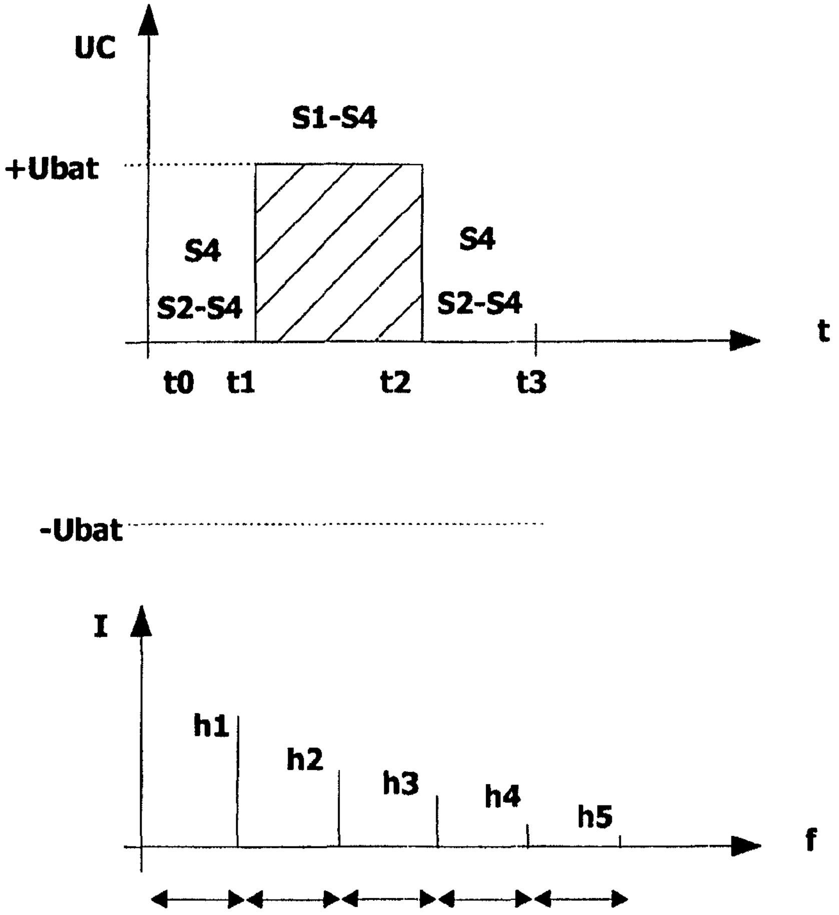
FIG. 14 represents a nonlimiting example of a voltage signal generated by the power stage of FIG. 13 and an associated current frequency spectrum.

The power stage P operates in the following manner in half-bridge mode as illustrated in the example of FIG. 14. It will be noted that the switch S4 is always closed.

- Between the intervals t0-t1 and t2-t3, either the three other switches S1-S2-S3 are open, or the switch S2 is closed, the other two S1-S3 being open. The voltage UC/UF is zero.
- Between the interval t1-t2, the switch S1 is closed, the other two S2-S3 being open. The voltage UC/UF is positive. Or the switch S2 is closed, the other two S1-S3 being open. The voltage UC/UF is negative.

When the power stage P operates in half-bridge mode, the voltage obtained can be used to obtain a second range of currents G2=[I21-I22] that is smaller than the first range and in particular twice as small.

Thus, the power stage P is used to obtain the initial power PI via the calibration voltage UC but also the setting power PR via the functional voltage UF.

Thus, depending on the wanted current Iv that is to be obtained, the power stage P is used in full-bridge mode (large range of currents G1) or in half-bridge mode (small range of currents G2).

This makes it possible to obtain a magnetic field Be via the antenna device A regulated according to the wanted vehicle type. In practice, for example for family-type vehicles, a full bridge will be used to supply an emitted magnetic field Be corresponding to an area ZO delimiting the passenger compartment VH of this family vehicle, whereas for coupe type vehicles with a smaller passenger compartment, a half bridge will be used to supply an emitted magnetic field Be corresponding to this different and smaller passenger compartment.

Thus, thanks to this full-bridge or half-bridge mode operation, there is an appropriate field coverage depending on the type of vehicle without changing RLC circuit in the antenna device A and therefore without needing to adapt the resistance R of this circuit. The control device DC will be programmed exactly according to the type of vehicle V to operate the power stage P appropriately.

Moreover, it will be noted that, for one and the same vehicle, there may also be a need for a wide range of currents, for example in the case where there is a wide variation in the battery voltage Ubat of the vehicle. In practice, the setting power PR needed to send the functional signals S_FONC depends on this battery voltage and on the impedance of the antenna device Zr. In order to compensate the variations of the battery voltage Ubat, the setting duty cycle $\alpha 2$ is set appropriately. For example, for a high battery voltage, the power stage P is made to operate in half-bridge mode, whereas for a low battery voltage, it is made to operate in full-bridge mode.

Figure 15:
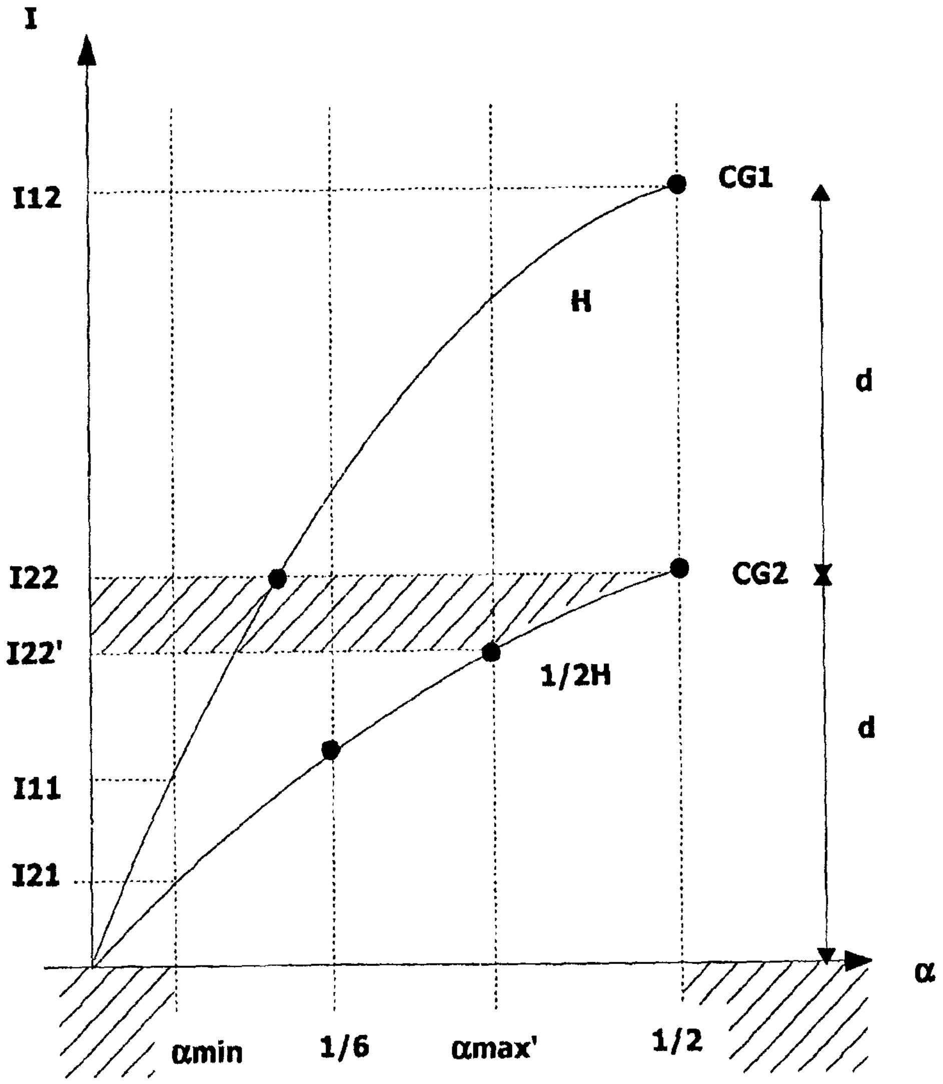
FIG. 15 represents a diagram representing ranges of currents used in the method of FIG. 4.

In order to obtain a continuous band between the two ranges of currents G1 and G2, in a nonlimiting embodiment, the setting duty cycle $\alpha 2$ lies within the interval [⅙-½]. This is illustrated in FIG. 15 representing a duty cycle—current diagram. On the x axis, the duty cycle $\alpha$ is represented and the current I is represented on the y axis. On the y axis, the respective limits I11, I12 and I21, I22 of the two ranges G1 and G2 can be seen. When the duty cycle $\alpha 2$ varies within the interval [⅙-½], it can be seen that, when operating in half-bridge mode ½H, the curve CG2 of the second current range G2 applies. On the other hand, when operating in full-bridge mode H, the curve CG1 of the first range G1 applies. Finally, it can be seen that on changing from half-bridge mode operation to full-bridge mode operation, the change from range G2 to G1 is continuous, that is, with no jump in the current values I.

In another embodiment, if the duty cycle $\alpha 2$ varies within the interval [⅙-$\alpha$ max'] with $\alpha$ max' less than ½, as illustrated in FIG. 15, it can be seen that there is a jump in the current values when changing from half-bridge to full-bridge mode. In this case, certain current values cannot therefore be taken into account to determine the power of the antenna device A. These are the ones that lie within the interval I22' and I22 shaded. In the latter mode, in order to ensure continuity, the bottom limit $\alpha$min of the interval must be taken to be less than ⅙.

Current Measuring Device C

In a first embodiment, the current measuring device is a peak amplitude detector. This is a simple means of measuring the current. It can be used to measure the maximum amplitude of the current, which is all that is needed because the nuisance harmonics have been eliminated by the symmetrical command and the duty cycle of ⅓. Thus, this measurement will give the value of the fundamental of this current. Conventionally, it consists of a diode and a capacitor, as illustrated in FIG. 12.

It sends the value of the measured current Im to the computation member CALC as illustrated in FIG. 12.

Of course, other current measuring means can be used.

For example, the current measuring device C can be a digital sampling device or else a device that rectifies current and then averages the rectified current.

It will be noted that the antenna device A comprises one or more antennas. In the nonlimiting example described, it comprises a plurality of antennas as seen previously. In this practical case, for each antenna of the antenna device A, the current in the antenna is set to obtain a nominal magnetic field B0 associated with and corresponding to the communication area ZO between the badge ID and the antenna. Thus, the badge ID comprises a plurality of fixed threshold values S0, associated with each antenna of the antenna device A.

It will be noted that the example taken has been described with an internal antenna. It would of course be possible to apply the method to an external antenna if necessary.

Furthermore, it will be noted that the examples have been taken with an antenna device A emitting low-frequency signals and an identification object ID emitting radio frequency signals, but of course other examples can be taken with signal emissions at other frequencies.

Thus, the invention presents the following benefits:

- it provides a way of controlling the value of the magnetic field emitted by the antenna device A by regulating the power on emission that makes it possible to obtain a fixed threshold for the identification object and is simpler to manage than a variable threshold for said object;
- by programming the identification object ID with a predetermined fixed threshold, it becomes possible to avoid the radio disturbances and therefore the spurious magnetic fields;
- moreover, this threshold is fixed for all the vehicles which makes it possible to have a universal identification object ID that operates with all vehicles, the communication area ZO being adapted only by the emission power Pe and therefore by the current I circulating in the antenna device A;
- the power is regulated by means of a duty cycle regulation which is less costly than a voltage regulation with fixed duty cycle;
- the duty cycle is regulated according to the current which is more effective and accurate than a setting according to the battery voltage because the variations of the impedance Zr of the antenna device A are compensated, unlike a solution regulating the power supply voltage Ubat;
- the symmetrical H bridge control makes it possible not to emit the even harmonics and consequently to reduce the problems of electromagnetic compatibility, EMC;
- the symmetrical calibration control with a duty cycle of ⅓ makes it possible to take an accurate measurement of the current with a simple measurement means such as the peak amplitude detector;
- control with a square voltage makes it possible to avoid overheating of the transistors of the power stage;
- it provides a way of obtaining a wide range of currents if necessary, for one and the same vehicle or for different vehicles, without needing to adapt the circuit of the antenna device A;
- the calibration step, which is used to determine a setting power in order to determine the value of the magnetic field emitted by the antenna device, is dynamic in that it is performed while the antenna device is operating;
- the dynamic calibration step requires no additional external measuring instrument, unlike static calibration steps that are carried out upstream, that is, while an antenna device is being fitted (that is, when it is being debugged) in a vehicle (therefore even before the vehicle is put into production and marketed);
- it makes it possible to control the value of the magnetic field emitted by the antenna device when it is used in a vehicle by taking into account the variations of the impedance of the antenna device so as to obtain a fixed threshold for the identification object, these impedance variations appearing while the antenna device is in use;

the detection system comprising the antenna device and the identification object can be used to perform a self-calibration of an antenna device with no external measuring instrument.

Obviously, the invention is not limited to the application described for a motor vehicle, but can be used in all applications involving a low-frequency antenna and an identification object, such as a home automation application for example.

What is claimed is:

1. A method of detecting an identification object in an area around an antenna device, comprising:

initializing the identification object with a fixed threshold value dependent on a received nominal magnetic field, emitting a calibration signal in the direction of the antenna device to determine a setting power only when the antenna device is operating, measuring a current circulating in the antenna device when emitting the calibration signal, comparing a measured current to an initial current, determining, on the basis of a comparison, the setting power to be applied to the antenna device, setting the setting power with an operating voltage having a given duty factor, emitting a functional signal corresponding to the setting power in the direction of the antenna device such that the antenna device emits a predetermined magnetic field, measuring a magnetic field received by the identification object that corresponds to the emitted predetermined magnetic field, comparing the measured magnetic field to the nominal magnetic field, and determining, on the basis of a comparison, whether the identification object is located inside the area around the antenna device.

2. The detection method as claimed in claim 1, wherein the calibration signal is unintelligible to the identification object.

3. The detection method as claimed in claim 1, wherein the operating voltage is a symmetrical signal.

4. The detection method as claimed in claim 1, wherein the given duty cycle is equal to ⅓.

5. The detection method as claimed in claim 1, wherein the operating voltage is generated by means of a power stage with full-bridge or half-bridge control.

6. The detection method as claimed in claim 1, wherein the calibration signal is triggered on the basis of a particular event.

7. The detection method as claimed in claim 6, wherein the particular event is a vehicle access.

8. The detection method as claimed in claim 6, wherein the particular event is a battery voltage variation.

9. The detection method as claimed in claim 1, wherein the initialization of the identification object with the fixed threshold value is made by writing the fixed threshold value in a memory of the identification object.

10. The detection method as claimed in claim 1, wherein the area around the antenna device is defined by the nominal magnetic field.

11. The detection method as claimed in claim 1, wherein the area around the antenna device corresponds to a vehicle passenger compartment.

12. A system for detecting an identification object in an area around an antenna device, comprising:

a control device;

an antenna device; and an identification object, wherein the control device is configured to:

emit a calibration signal in the direction of the antenna device to determine a setting power only when the antenna is operating, measure a current flowing in the antenna when emitting the calibration signal, compare a measured current to an initial current, determine, on the basis of a comparison, the setting power to be applied to the antenna device, set the setting power with an operating voltage having a given duty cycle, emit a functional signal corresponding to the setting power in the direction of the antenna device such that the antenna device emits a predetermined magnetic field, and determine, on the basis of a comparison made between the magnetic field received by the identification object and a nominal magnetic field, whether the identification object is located inside the area around the antenna device, and wherein the identification object is initialized with a fixed threshold value dependent on a received nominal magnetic field, and is configured to measure the received magnetic field corresponding to the emitted magnetic field and compare the received magnetic field with the nominal magnetic field.

13. An antenna device able to cooperate with an identification object initialized with a fixed threshold value dependent on a received nominal magnetic field, wherein the antenna device is configured to:

receive a calibration signal corresponding to an initial current and to a predetermined initial power only when the antenna is operating, measure a current flowing in the antenna device when emitting the calibration signal, compare the measured current with the initial current, determine, on the basis of a comparison, a setting power to be applied to the antenna device, set the setting power with an operating voltage having a given duty cycle, receive a functional signal corresponding to the setting power so as to emit a predetermined magnetic field, and transmit the functional signal to the identification object, the latter receiving a magnetic field dependent on the magnetic field emitted by the antenna device, the magnetic field being compared with the nominal magnetic field.

14. A control device able to cooperate with an antenna device and with an identification object initialized with a fixed threshold value dependent on a received nominal magnetic field, wherein the control device comprises a signal emitter for:

emitting a calibration signal corresponding to an initial current in a direction of the antenna device to determine a setting power only when the antenna device is operating, measuring a current flowing in the antenna when emitting the calibration signal, comparing a measured current to the initial current, determining, on the basis of a comparison, the setting power to be applied to the antenna device, setting the setting power with an operating voltage having a given duty cycle, and emitting a functional signal corresponding to the setting power in the direction of the antenna device so that the antenna device emits a predetermined magnetic field, and wherein the control device includes a signal receiver for receiving a response from the identification object based on a comparison made between a received magnetic field and the nominal magnetic field.

15. The control device as claimed in claim 14, wherein the comparison is made by the identification object.

16. A motor vehicle comprising a passenger compartment in which there is a control device as claimed in claim 14 and an antenna device able to cooperate with an identification object initialized with a fixed threshold value dependent on a received nominal magnetic field, wherein the antenna device is configured to:

receive a calibration signal corresponding to both an initial current and a predetermined initial power only when the antenna device is operating, measure a current flowing in the antenna device when emitting the calibration signal, compare a measured current with the initial current, determine, on the basis of a comparison, a setting power to be applied to the antenna device, set the setting power with an operating voltage having a given duty cycle, receive a functional signal corresponding to a predetermined setting power so as to emit a predetermined magnetic field, and transmit the functional signal to the identification object, the latter receiving a magnetic field dependent on the magnetic field emitted by the antenna device, the magnetic field being compared with the nominal magnetic field, wherein the control device and the antenna device are configured to cooperate with the identification object.

* * * * *